(12) United States Patent
Barney et al.

(10) Patent No.: US 9,766,427 B1
(45) Date of Patent: Sep. 19, 2017

(54) PRECISION OPTO-MECHANICAL LOW PROFILE QUASI-KINEMATIC MIRROR ADJUSTER SCREW ASSEMBLY AND METHOD FOR COMPONENT INTEGRATION

(71) Applicant: Lockheed Martin Corporation, Bethesda, MD (US)

(72) Inventors: Steven J. Barney, Orlando, FL (US); Bruce E. Chisholm, Orlando, FL (US); Matthew E. South, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 553 days.

(21) Appl. No.: 14/275,537

(22) Filed: May 12, 2014

Related U.S. Application Data

(62) Division of application No. 12/407,162, filed on Mar. 19, 2009, now abandoned.

(60) Provisional application No. 61/037,743, filed on Mar. 19, 2008.

(51) Int. Cl.
  *G02B 7/182* (2006.01)
  *F16H 25/12* (2006.01)

(52) U.S. Cl.
  CPC ............ *G02B 7/182* (2013.01); *F16H 25/12* (2013.01)

(58) Field of Classification Search
  CPC .... F16B 5/0216; F16B 5/0233; G02B 7/1825; G02B 7/1824; G02B 7/1822; G02B 7/023
  See application file for complete search history.

(56) References Cited

U.S. PATENT DOCUMENTS

| | | | |
|---|---|---|---|
| 1,330,673 A | | 2/1920 | Anderson |
| 2,940,784 A | | 6/1960 | Fell |
| 3,356,324 A | * | 12/1967 | Attermeyer ............. F16M 7/00 248/188.4 |
| 3,436,050 A | | 4/1969 | Tibbals, Jr. |
| 3,897,139 A | * | 7/1975 | Caruolo ................. H01S 3/086 248/477 |
| 3,971,537 A | * | 7/1976 | Winkle .................. B60L 13/10 248/188.4 |
| 4,108,407 A | | 8/1978 | Cable et al. |
| 4,127,037 A | | 11/1978 | Weaver |
| 4,433,824 A | * | 2/1984 | Koosha ................. F16M 11/04 248/188.4 |
| 4,934,861 A | | 6/1990 | Weeks et al. |
| 5,131,621 A | | 7/1992 | Sdano |
| 5,160,225 A | | 11/1992 | Chern |

(Continued)

OTHER PUBLICATIONS

F.I.T. Inc., "Screw, Machine—Adjusting," Dec. 1982, 2 pages.

(Continued)

*Primary Examiner* — Michael P Ferguson
(74) *Attorney, Agent, or Firm* — Withrow & Terranova, PLLC

(57) ABSTRACT

A mirror assembly is disclosed. The mirror assembly includes a housing and a mirror that are movable with respect to one another. The mirror assembly includes a plurality of primary adjustment mechanisms. Each primary adjustment mechanism includes a conical washer, a hollow adjuster screw comprising external threads configured to threadedly engage the housing, a wave spring fitting over said hollow adjuster screw, a jam nut seated atop said wave spring, and a spherical head screw configured to threadedly engage the mirror.

18 Claims, 7 Drawing Sheets

(56) References Cited

U.S. PATENT DOCUMENTS

| | | | |
|---|---|---|---|
| 5,333,976 A | * | 8/1994 | Dobbrunz ............. F16B 5/0233 411/263 |
| 5,511,760 A | | 4/1996 | Kambara |
| 5,772,351 A | | 6/1998 | Ching |
| 7,451,930 B1 | | 11/2008 | Neff |
| 2005/0079012 A1 | | 4/2005 | Mochizuki |
| 2008/0056809 A1 | | 3/2008 | Kielczewski et al. |

OTHER PUBLICATIONS

Hughes Aircraft Company, "Screws, Machine—Hexagon Socket Head, Expander," Standard 965807, Revision M, 1983, 7 pages.
Non-final Office Action for U.S. Appl. No. 12/407,162 mailed Aug. 17, 2011, 11 pages.
Final Office Action for U.S. Appl. No. 12/407,162 mailed Apr. 11, 2012, 16 pages.
Non-final Office Action for U.S. Appl. No. 12/407,162 mailed Aug. 5, 2013, 11 pages.
Final Office Action for U.S. Appl. No. 12/407,162 mailed Feb. 12, 2014, 13 pages.

\* cited by examiner

PRECISION OPTO-MECHANICAL LOW PROFILE QUASI-KINEMATIC MIRROR ADJUSTER SCREW ASSEMBLY AND METHOD FOR COMPONENT INTEGRATION

CROSS-REFERENCE TO RELATED APPLICATIONS

This application is a divisional of co-pending U.S. patent application Ser. No. 12/407,162, filed on Mar. 19, 2009, entitled PRECISION OPTO-MECHANICAL LOW PROFILE QUASI-KINEMATIC MIRROR ADJUSTER SCREW ASSEMBLY AND METHOD FOR COMPONENT INTEGRATION, which claims priority to and the benefit of U.S. Provisional Patent Application Ser. No. 61/037,743, entitled PRECISION OPTO-MECHANICAL LOW PROFILE QUASI-KINEMATIC MIRROR ADJUSTER SCREW ASSEMBLY AND METHOD FOR COMPONENT INTEGRATION, filed on Mar. 19, 2008, the disclosures of each of which are hereby incorporated herein by reference in their entireties.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Technical Field

The present invention relates to optical component adjustment mechanisms and methods of use and manufacture.

Description of Related Art

A recent survey of mirror adjuster mechanisms showed that designs used in the past do not allow fully kinematic movement of the adjuster and mirror assembly when mounting and aligning optics in tactical hardware. Typically a non-kinematic mount for optical adjustment induces assembly stresses and creates operational and testing issues as the optical alignment moves over temperature and vibration extremes. Additionally, conventional mechanisms have a large profile height, such as jam nut/O-ring pre-load assemblies, use of nylon strips for locking, adjusters with no locking features, and flare locks. The present invention solves these deficiencies.

BRIEF SUMMARY OF THE INVENTION

The present invention is of an adjustment mechanism (and concomitant method of adjustment) comprising: a conical washer; an adjuster screw seated on the conical washer; a wave spring fitting over the adjuster screw; a jam nut seated atop the wave spring; and a spherical head screw inserted through the adjuster screw. In the preferred embodiment a flat washer is employed between the wave spring and the jam nut. The adjuster screw comprises slots (preferably opposing one another) on an inside face of an end of the adjuster screw, with a hollow spanner comprising projections at an end thereof being used to engage the slots. A torque driver passes through the spanner and engages the spherical head screw. The adjuster screw is rounded on a portion seated on the conical washer. The adjustment mechanism is particularly suitable as a mirror adjustment mechanism. The invention is also of a mirror assembly comprising a plurality of the adjustment mechanisms, such as a plurality of primary adjustment mechanisms, a plurality of fix fold adjustment mechanisms, and a plurality of tertiary adjustment mechanisms.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
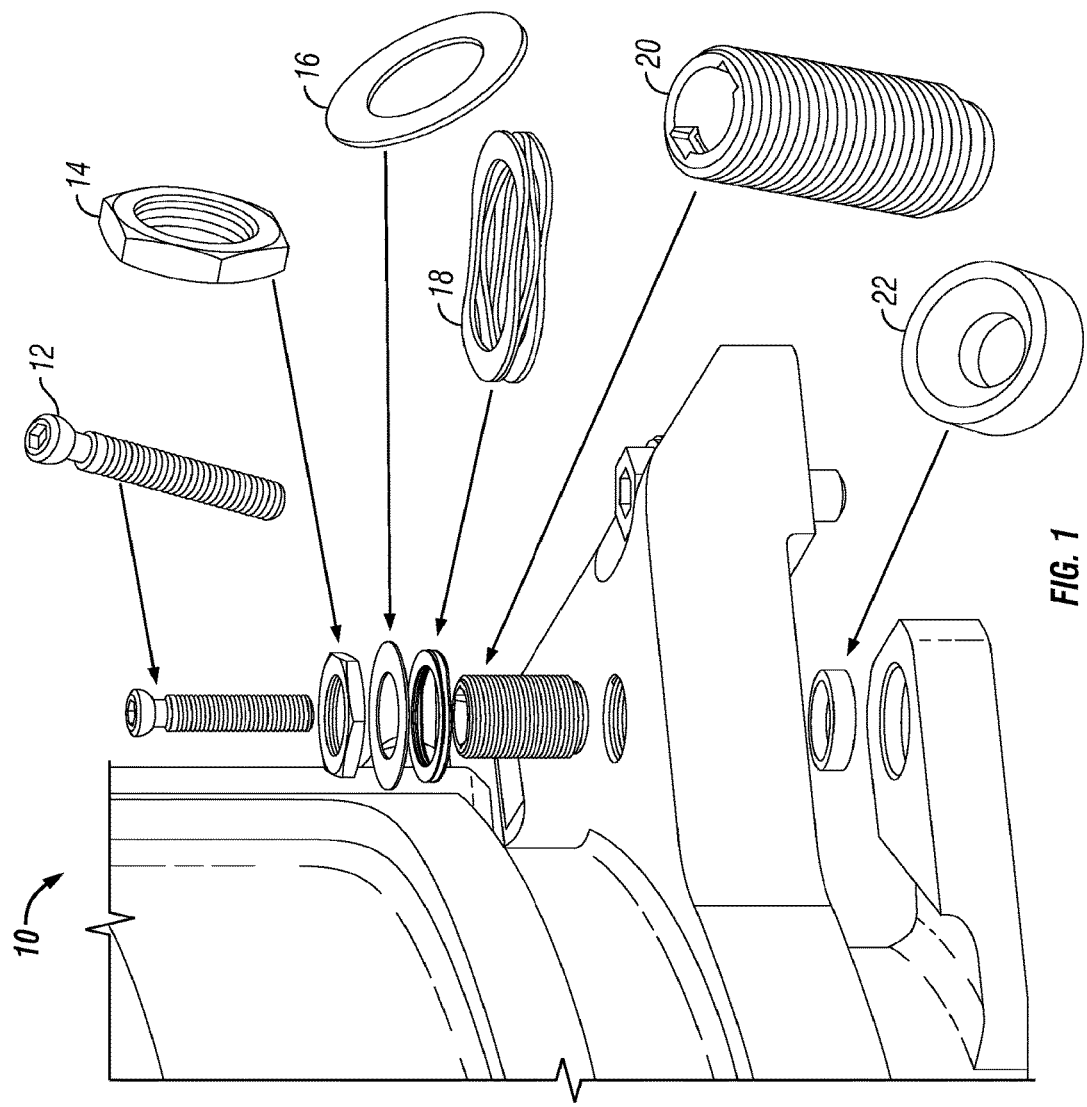
FIG. 1 is an exploded assembly view of the present invention.

The mirror adjuster screw mechanism and methods of the invention are designed to provide a low profile height above the mirror back or housing surface and utilize a mount interface that is quasi-kinematically constrained. The invention improves over previous attempts to minimize mirror distortion and retain precise position by making a hybrid adjuster that utilizes, preferably, two novel ball and cone circular line contacts in conjunction with the use of a wave spring and a jam nut to maintain preload over tactical temperature and vibration environments for a 20-year life requirement. The diameter of a spherical head screw and a conical angle which is machined into the barrel adjuster screw preferably dictates how deep the screw head will reside within the barrel adjuster screw design which forms a radial ball and cone circular line contact. The bottom of the barrel adjuster screw preferably has a radius which will mate with a modified conical swivel washer which forms the second radial ball and cone interface of this quasi-kinematically constrained adjuster design.

When the jam nut is torqued and the wave spring is compressed to the design deflection height, the threads extending above the jam nut and extending below the mating housing or mirror preferably dictate the range of travel depending on component configuration and integration. For a 0.3125-40 UNS outside threaded barrel screw adjuster, the mirror can translate 0.025 in. of travel per one revolution of the adjuster design. The length of the barrel adjuster screw is preferably sized for the particular optical travel requirements for the given mirror. Locking threaded inserts for the spherical head screw are preferably utilized in order to load up the barrel adjuster to the mirrors. Spot epoxy is preferably used to lock the jam nut onto the barrel adjuster screw.

A special spanner tool preferably picks up slotted features on the mirror adjuster screw in order to facilitate rotation, and thus mirror tilting, or translation. The spanner tool is preferably hollow through the center axis, to allow the simultaneous use of a hex torque driver in order to gain access to the spherical head screw used in the mirror adjuster screw design.

The traditional barrel mirror adjuster used has a hex head feature for rotation, which then uses a screw on top of the hex which needs to be preloaded with Belleville washers used to load the barrel onto the mirror, which lends itself to a higher profile height. Some programs have used lock nuts, while others use a strip of nylon to lock the threads of the barrel adjuster which is not favorable from a repeated disassembly standpoint.

The threaded barrel nut type of adjuster are all essentially the same, except some use washer sandwiched o-rings for preload under a jam nut, while others do not pre-load the jam nut in some cases. Also, some use a lock nut, while others modify the threads on the barrel hex screw adjuster to have an impregnated strip of nylon for locking.

The adjuster design of the invention is also distinct from prior adjuster screws. The prior adjuster has a much shorter profile, but there is no method to ensure the screw is pre-loaded to the adjuster nut. Additionally, the prior screw head is conical, therefore bending of the screw could occur due to the wedge contact interface. The prior adjuster relies on the flared slotted feature of the barrel nut to lock the OD threads of the adjuster barrel with the mirror threads.

There is also a potential metal burr problem with slotting the outside threads of the barrel as this can also be a Foreign Object Damage issue, as well as possibly running into problems torquing the adjuster when the adjuster flares out on the prior adjuster design. There can be long term wear issues with these threads, especially through continuous adjustment, and disassembly.

To reiterate, while certain available adjusters are closer in profile height, they have conical wedge screws that can bind, and the locking feature comprises the interference of the threads when the barrel nut flares out. Additionally, the ball interface is an extra part. The present invention avoids using thread interference as the locking feature, as well as avoiding the burr inspection issue and Foreign Object Damage with slotting the sides of the barrel. The traditional barrel adjuster has a hex head, which then uses a screw on top of the hex which needs to be preloaded with Belleville washers which keeps the profile height on the high side. Some use lock nuts, while others use a strip of nylon to lock the threads of the barrel adjuster which is not favorable to some.

The Quasi-Kinematic Mirror adjuster design of the invention is more reliable, uses fewer parts, is closer to being fully kinematic when compared to alternative adjusters, and has a lower overall profile height than most mirror adjuster mechanisms, which is a crucial parameter when design space and volume is at a premium. These advantages lead to improved design flexibility, reduced test cycle times, reduced rework and improved test yields.

Figure 2:
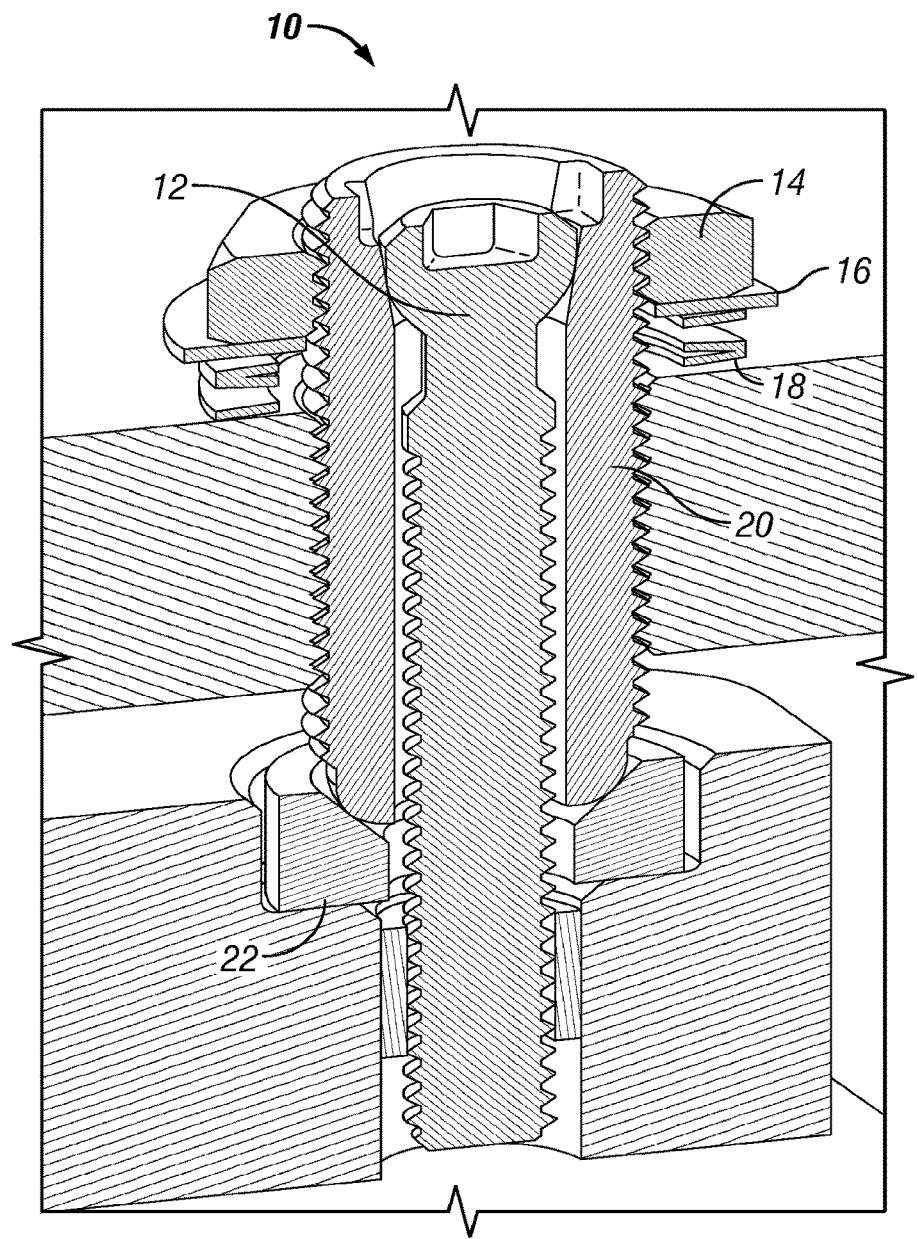
FIG. 2 is a top perspective cut-away view of the invention.

Turning to the figures, FIG. 1 shows the invention 10 in exploded view, comprising spherical screw 12, jam nut 14, flat washer 16, wave spring 18, adjuster screw 20, and conical washer 22. The spherical screw preloads the adjuster screw onto the mirror using the conical washer. The jam nut secures the adjuster screw in place once the adjustment is made. The wave spring is preferably a Crest-to-Crest® wave spring and is used with the flat washer to maintain the jam nut pre-load over temperature and vibration fluctuations of the mirror. FIG. 2 shows the invention as installed in cut-away view.

Figure 5:
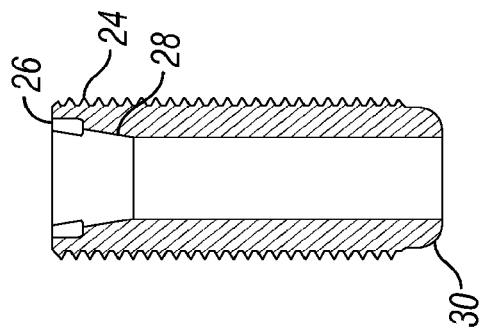
FIG. 5 is a side sectional view of the adjuster screw of the invention.
Figure 4:
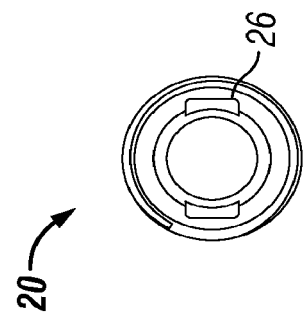
FIG. 4 is a top view of the adjuster screw of the invention.
Figure 3:
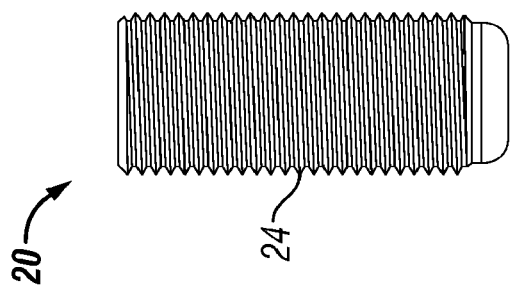
FIG. 3 is a side view of the adjuster screw of the invention.
Figure 6:
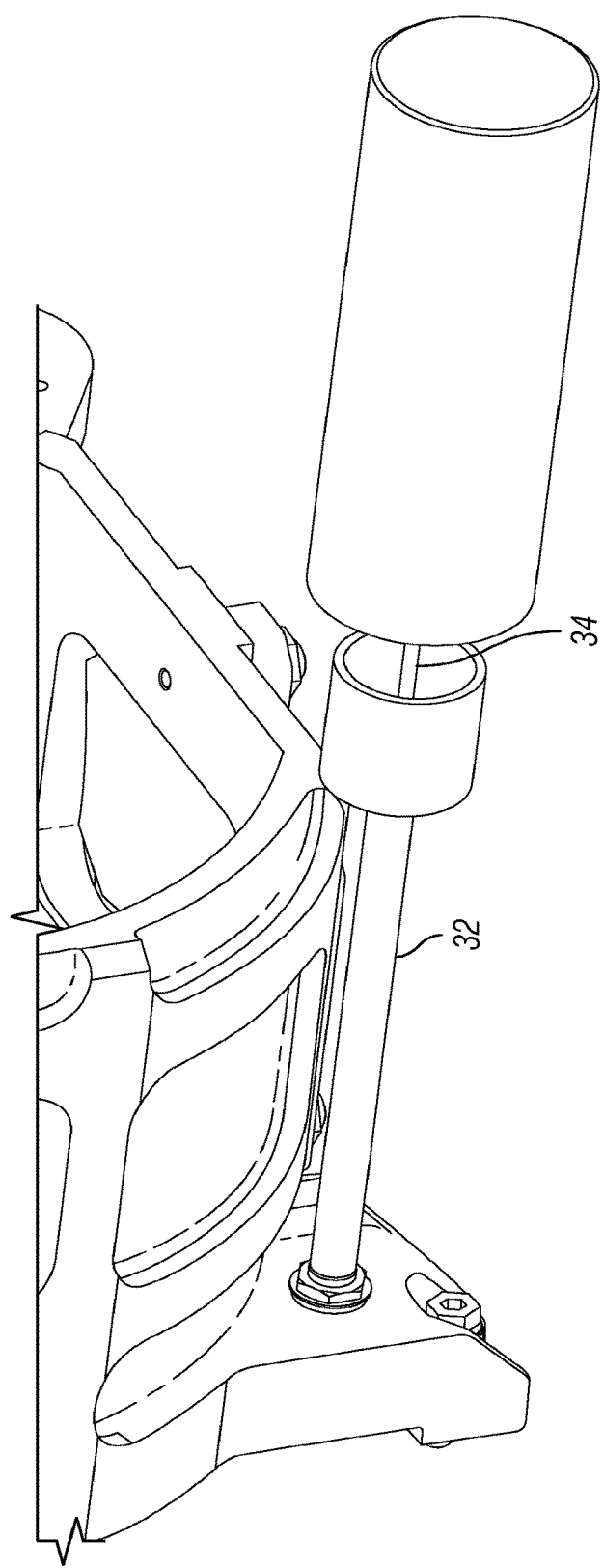
FIG. 6 is a perspective view of the adjuster spanner tool of the invention.
Figure 7:
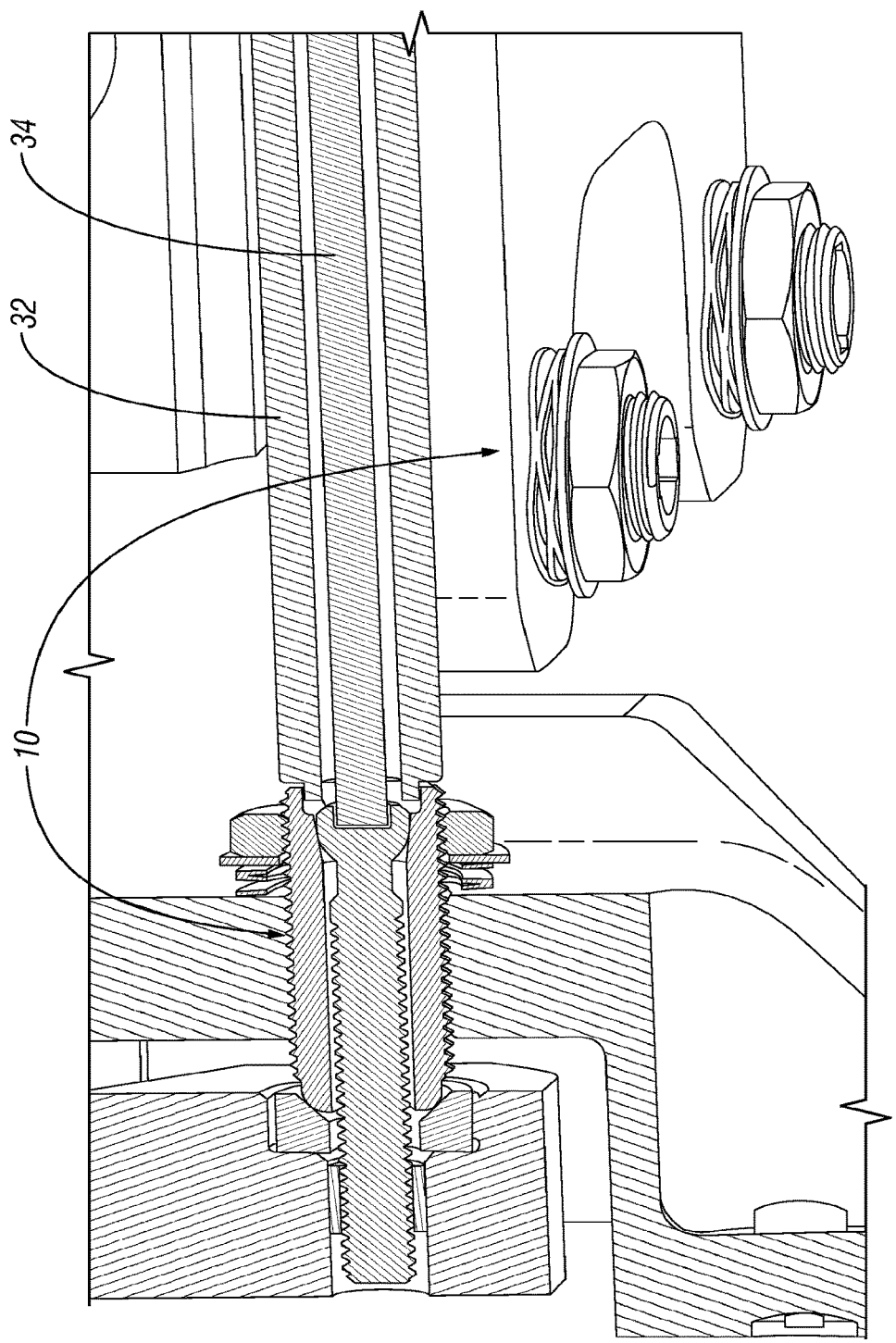
FIG. 7 is a side cut-away view of the adjuster spanner tool of the invention.

FIGS. 3-5 show the preferred adjuster screw 20 of the invention, comprising outer threads 24, opposed slots 26, inner channel 28, and rounded bottom 30. FIGS. 6-7 show the preferred adjuster spanner tool 32 of the invention, which picks up on the opposed slots of the adjuster screw. The tool is preferably hollow to allow the simultaneous usage of a hex torque driver 34 needed for the spherical head screw, as shown.

Figure 8:
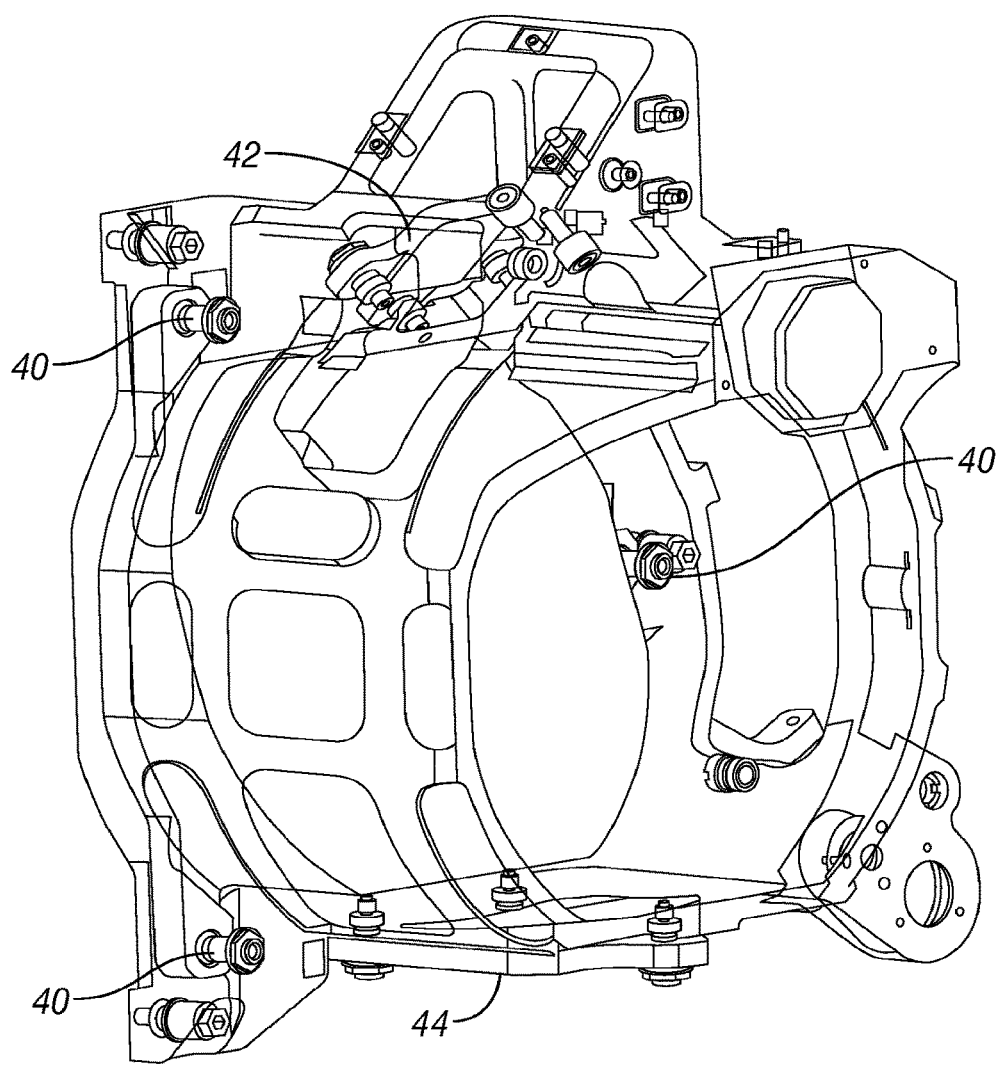
FIG. 8 is a side perspective view of an exemplary use of a plurality of the inventions to adjust and keep adjusted an afocal mirror.
Figure 9:
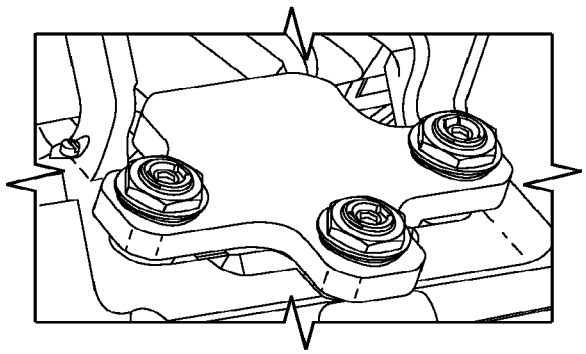
FIG. 9 is a top perspective view of use of the invention as fix fold adjustments.
Figure 10:
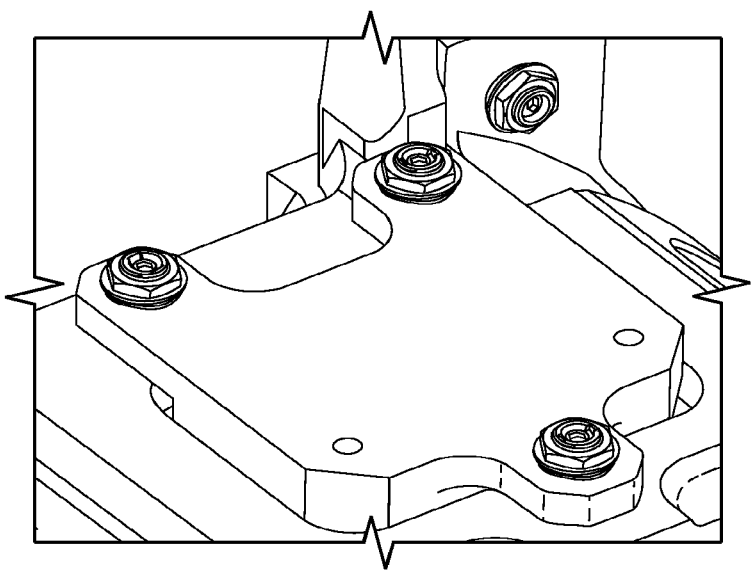
FIG. 10 is a top perspective view of use of the invention as tertiary mirror adjustments.

FIGS. 8-10 show an afocal mirror employing a plurality of the inventions to maintain proper adjustment of the mirror. In this example, three primary adjustments 40 are employed, together with three fix fold adjustments 42 and three tertiary adjustments 44. As understood by one of ordinary skill in the art, the number of adjustment mechanisms can vary widely depending on the design of the mirror. While the preferred embodiment of the invention is directed to a mirror assembly, the invention is also useful in many types of precision mechanical mounts, particularly optical mounts.

Note that in the specification and claims, "about" or "approximately" means within twenty percent (20%) of the numerical amount cited.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A mirror assembly comprising:
   a housing and a mirror, the housing and the mirror being movable with respect to one another;
   a plurality of primary adjustment mechanisms, each primary adjustment mechanism comprising:
   a conical washer having an opening, said opening defined in part by an annular first conical surface that slants inward toward a center of the opening;
   a hollow adjuster screw having an interior volume that includes a through hole, a first end portion, and a second end portion, an annular second conical surface defining a portion of said through hole at said first end portion, and said second end portion having a rounded exterior surface, said rounded exterior surface configured to contact said annular first conical surface of said conical washer when in operation seated on said conical washer, the hollow adjuster screw comprising external threads configured to threadedly engage the housing, wherein the conical washer is disposed between the hollow adjuster screw and the mirror;

a wave spring fitting over said hollow adjuster screw;

a jam nut seated atop said wave spring and threadedly engaging said hollow adjuster screw to compress said wave spring against the housing, wherein the wave spring is disposed between the jam nut and the housing; and a spherical head screw having a head portion and a shaft portion configured to be disposed in said hollow adjuster screw, said head portion having a spherical surface configured to contact said annular second conical surface of said hollow adjuster screw, and configured to fit completely within the interior volume of the hollow adjuster screw, the spherical head screw being further configured to threadedly engage the mirror.

2. The mirror assembly of claim 1, wherein the plurality of primary adjustment mechanisms numbers three primary adjustment mechanisms.

3. The mirror assembly of claim 1, wherein rotation of the hollow adjuster screw alters a distance between the housing and the mirror.

4. The mirror assembly of claim 3, wherein the plurality of primary adjustment mechanisms comprises a first primary adjustment mechanism, a second primary adjustment mechanism, and a third primary adjustment mechanism.

5. The mirror assembly of claim 4, wherein a surface of the mirror defines a first plane, and a second plane that intersects the housing is parallel with respect to the first plane, wherein the first primary adjustment mechanism, the second primary adjustment mechanism, and the third primary adjustment mechanism are configured such that an equal rotation amount of the hollow adjuster screw of the first primary adjustment mechanism, the hollow adjuster screw of the second primary adjustment mechanism and the hollow adjuster screw of the third primary adjustment mechanism axially moves the mirror with respect to the housing such that the first plane and the second plane remain parallel with respect to one another.

6. The mirror assembly of claim 4, wherein a surface of the mirror defines a first plane, and a second plane that intersects the housing is parallel with respect to the first plane, wherein the first primary adjustment mechanism, the second primary adjustment mechanism, and the third primary adjustment mechanism are configured such that an unequal rotation amount of the hollow adjuster screw of the first primary adjustment mechanism with respect to the hollow adjuster screw of the second primary adjustment mechanism axially moves the mirror with respect to the housing such that the first plane and the second plane become non-parallel with respect to one another.

7. The mirror assembly of claim 1, wherein the mirror comprises a plurality of recesses, each recess corresponding to one of the plurality of primary adjustment mechanisms, and wherein the conical washer of each primary adjustment mechanism fits completely within the corresponding recess.

8. The mirror assembly of claim 7, wherein a diameter of each recess is larger than a diameter of a corresponding conical washer that fits completely within the corresponding recess to allow lateral movement of the corresponding conical washer with respect to the mirror.

9. The mirror assembly of claim 1, further comprising a flat washer positioned between the wave spring and the jam nut, wherein the flat washer and the wave spring are configured to maintain a preload of the jam nut with respect to the housing.

10. The mirror assembly of claim 1, wherein the spherical head screw and the conical washer are configured to axially preload the hollow adjuster screw with respect to the mirror.

11. The mirror assembly of claim 1, wherein an internal surface of the first end portion of the hollow adjuster screw forms a plurality of slots, wherein the head portion of the spherical head screw forms a recess having a first shape, and further comprising an adjustment tool comprising:

a hollow cylinder having a first length, a first cylinder end portion, and a second cylinder end portion, the first cylinder end portion configured to engage the plurality of slots formed in the internal surface of the first end portion of the hollow adjuster screw; and a torque driver having a second length that is greater than the first length, configured to extend through the hollow cylinder, the torque driver having a first driver end portion that is configured to extend beyond the first cylinder end portion and fit within the recess of the head portion of the spherical head screw, and a second driver end portion that extends beyond the second cylinder end portion, the adjustment tool configured to facilitate rotation of the spherical head screw with respect to the hollow adjuster screw.

12. A mirror assembly comprising:

a mirror and a housing, the mirror and the housing being movable with respect to one another;

a plurality of primary adjustment mechanisms, each primary adjustment mechanism comprising:

a conical washer having an opening, said opening defined in part by an annular first conical surface that slants inward toward a center of the opening;

a hollow adjuster screw having an interior volume that includes a through hole, a first end portion, and a second end portion, an annular second conical surface defining a portion of said through hole at said first end portion, and said second end portion having a rounded exterior surface, said rounded exterior surface configured to contact said annular first conical surface of said conical washer when in operation seated on said conical washer, the hollow adjuster screw comprising external threads configured to threadedly engage the mirror, wherein the conical washer is disposed between the hollow adjuster screw and the housing;

a wave spring fitting over said hollow adjuster screw;

a jam nut seated atop said wave spring and threadedly engaging said hollow adjuster screw to compress said wave spring against the mirror, wherein the wave spring is disposed between the jam nut and the mirror; and a spherical head screw having a head portion and a shaft portion configured to be disposed in said hollow adjuster screw, said head portion having a spherical surface configured to contact said annular second conical surface of said hollow adjuster screw, and configured to fit completely within the interior volume of the hollow adjuster screw, the spherical head screw being further configured to threadedly engage the housing.

13. The mirror assembly of claim 12, wherein the plurality of primary adjustment mechanisms numbers three primary adjustment mechanisms.

14. The mirror assembly of claim 12, wherein rotation of the hollow adjuster screw alters a distance between the mirror and the housing.

15. The mirror assembly of claim 14, wherein the plurality of primary adjustment mechanisms comprises a first primary adjustment mechanism, a second primary adjustment mechanism, and a third primary adjustment mechanism.

16. The mirror assembly of claim 15, wherein a surface of the housing defines a first plane, and a second plane that intersects the mirror is parallel with respect to the first plane, wherein the first primary adjustment mechanism, the second primary adjustment mechanism, and the third primary adjustment mechanism are configured such that an equal rotation amount of the hollow adjuster screw of the first primary adjustment mechanism, the hollow adjuster screw of the second primary adjustment mechanism and the hollow adjuster screw of the third primary adjustment mechanism axially moves the housing with respect to the mirror such that the first plane and the second plane remain parallel with respect to one another.

17. The mirror assembly of claim 15, wherein a surface of the housing defines a first plane, and a second plane that intersects the mirror is parallel with respect to the first plane, wherein the first primary adjustment mechanism, the second primary adjustment mechanism, and the third primary adjustment mechanism are configured such that an unequal rotation amount of the hollow adjuster screw of the first primary adjustment mechanism with respect to the hollow adjuster screw of the second primary adjustment mechanism axially moves the housing with respect to the mirror such that the first plane and the second plane become non-parallel with respect to one another.

18. The mirror assembly of claim 12, wherein the housing comprises a plurality of recesses, each recess corresponding to one of the plurality of primary adjustment mechanisms, and wherein the conical washer of each primary adjustment mechanism fits completely within the corresponding recess.

\* \* \* \* \*